UNITED STATES PATENT OFFICE.

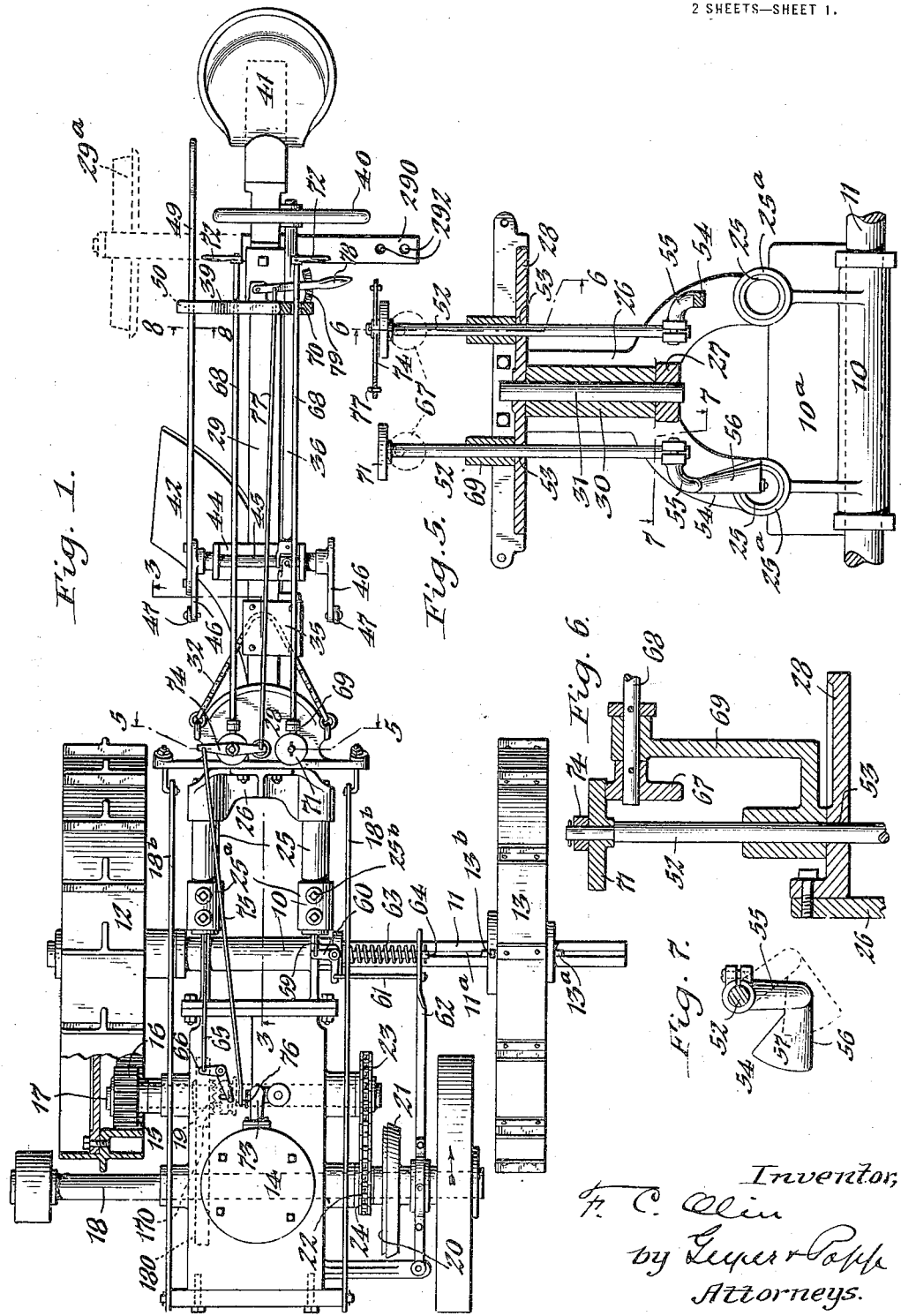

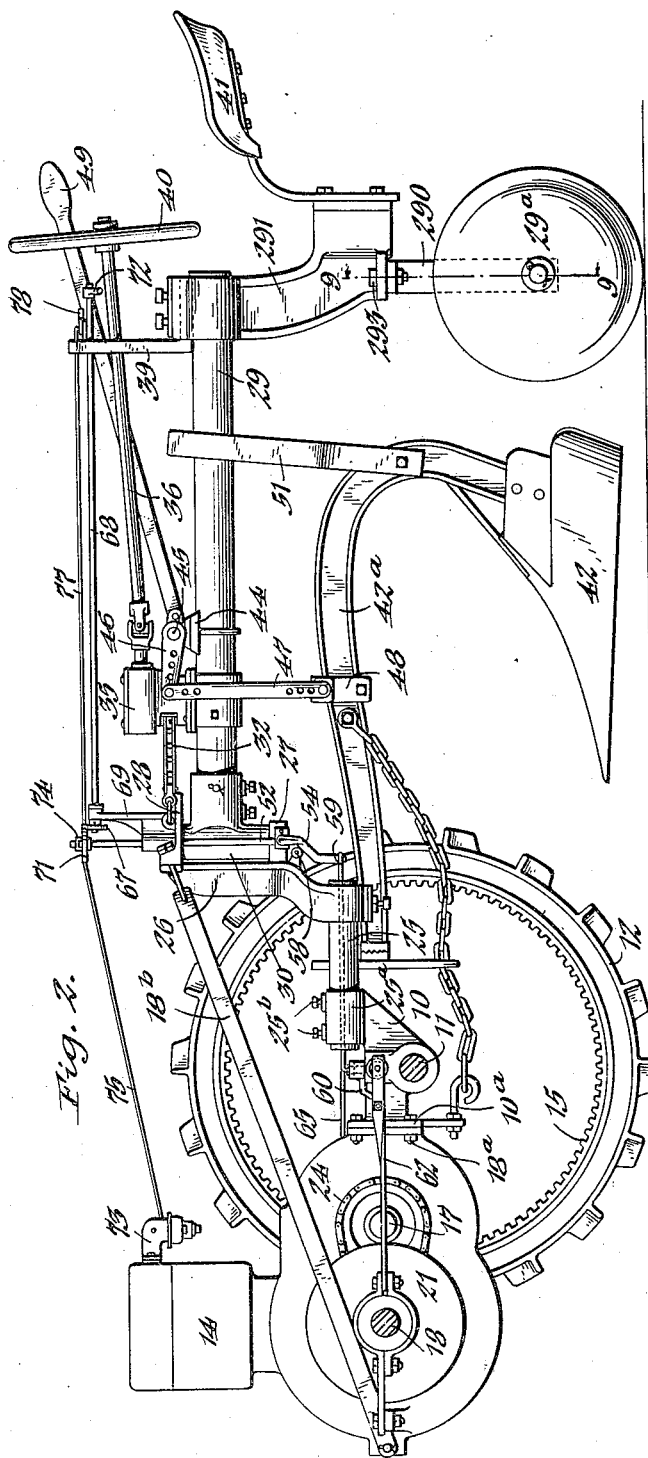

FRED C. OLIN, OF BUFFALO, NEW YORK.

TRACTOR.

1,423,962.  Specification of Letters Patent.  Patented July 25, 1922.

Application filed May 15, 1920. Serial No. 381,620.

*To all whom it may concern:*

Be it known that I, FRED C. OLIN, a citizen of the United States, residing in Buffalo, in the county of Erie and State of New York, have invented new and useful Improvements in Tractors, of which the following is a specification.

This invention relates to a tractor and more particularly to a two wheel tractor having a supplemental frame pivotally connected thereto for attaching a plow or other similar agricultural implement.

One of the objects of this invention is to provide a tractor of this character with a novel means of control, whereby the operator can conveniently manipulate the various controls from the rear seat thereof regardless of the relative angular position of the two frames.

Further objects are to provide a tractor of this character which is simple and durable in construction and whose weight is reduced to a minimum, yet sufficient enough to insure ample traction necessary for pulling a useful load.

In the accompanying drawings: Figure 1 is a top plan view of my improved tractor. Figure 2 is a side elevation thereof, partly in section. Figure 3 is a fragmentary longitudinal section on line 3—3, Fig. 1. Figure 4 is a horizontal section on line 4—4, Fig. 3. Figure 5 is an enlarged transverse section on line 5—5, Fig. 1. Figure 6 is a vertical section on line 6—6, Fig. 5. Figure 7 is a horizontal section on line 7—7, Fig. 5. Figure 8 is a fragmentary sectional view on line 8—8, Fig. 1. Figure 9 is a fragmentary vertical transverse section on line 9—9, Fig. 2.

Similar characters of reference refer to like parts throughout the several views.

In its general organization this improved machine comprises a two wheel main tractor frame to which is pivotally connected a supplemental frame adapted to support and carry an agricultral implement or the like. The machine is controlled from the seat of the supplemental frame and for this purpose means are employed for steering the main tractor frame on the supplemental frame, as well as means for controlling the motive power unit and transmission mechanism of the latter.

The main frame of the tractor comprises an axle bearing or support 10 in which is journaled the transversely arranged axle 11, on whose opposite ends are mounted the traction wheels 12, 13. The front end of this support is provided with a vertically arranged base plate $10^a$ to which is fastened the front end of an internal combustion engine 14 or other source of power which is employed for transmitting power to the traction wheels. As shown in Figs. 1, 2 and 3, the engine is preferably fastened to the base plate $10^a$ by bolts $18^a$ or other appropriate means and extends forwardly therefrom in an overhanging position. The traction or bull wheel 12 is preferably provided with an internal gear 15 meshing with a pinion 16 mounted on the counter shaft 17 to which motion is transmitted from the motor shaft 18 to propel the traction wheels forwardly by a gear wheel 180 on the shaft 18 engaging a pinion 170 on the shaft 17.

A suitable clutch 19 is employed for coupling and uncoupling the counter shaft 17 with the motor shaft. Reverse motion is transmitted to the shaft 17 for driving the tractor rearwardly by means of a reversing clutch, which preferably consists of an inner member 20 loosely mounted on the shaft 18 and an outer coupling member 21 keyed on the latter and movable lengthwise thereon to frictionally engage said inner member. Carried by the latter is a sprocket wheel 22 which is connected with a sprocket wheel 23 fixed on the counter shaft 17 by a chain 24. Thus, when the clutch 20, 21 is moved to its operative position, the counter shaft is driven in the same direction as the engine shaft, and the bull wheel 12, through the medium of the pinion 16, is caused to turn rearwardly.

25, 25 indicate a pair of horizontally arranged tubular supporting members or sections which are adjustably mounted at their front ends in the hollow cylindrical bored beads $25^a$ provided in the rear portion of the axle support 10 and secured thereto by bolts $25^b$. Carried by the rear ends of these tubular sections and suitably secured thereto is a steering yoke 26 having a lug 27 at its lower rear side and a steering segment 28 suitably secured at its upper rear side. To avoid any undue vibration of the engine 14, its front end is connected with the segment 28 or other adjacent part of the tractor frame by means of braces $18^b$ suitably attached at their opposite ends to said engine and segment, respectively. By making the sections 25, 25 adjustable lengthwise in their beads 25ª, it is possible to vary the distance between the axis of the axle of the traction wheels and the pivotal connection between the main tractor frame and supplemental frame, or insert longer section, when desired.

The supplemental frame which is pivotally connected to the main tractor frame comprises a body portion 29 preferably of tubular form, which extends rearwardly from the main frame and which is supported at its rear end by a trailer or follower wheel 29ª carried by a depending bracket 290 suitably secured to the lower end of the hanger 291 adjustably mounted thereon so as to move lengthwise thereof. The front end of this supplemental frame is pivotally connected to the main tractor frame, whereby lateral angular movement of the two frames relatively to each other is effected, so as to permit of steering the machine. For this purpose the front end of the supplemental frame is provided with a steering knuckle 30 which is connected to the steering yoke 26 of the main frame by a vertical coupling pin 31 passing through corresponding openings in said yoke and knuckle, as shown in Fig. 3.

The traction wheel 13 may be adjustably mounted on the axle 11, enabling the tractor to work in fields having rows of various widths and the follower wheel 29ª may be adjustable transversely so as to line up with the plow or with the bull wheel 12, when cultivating. For permitting this transverse adjustment of the traction wheel, the same is provided with a key or feather 13ª which engages a keyway 11ª extending lengthwise of the axle 11, a bolt 13ᵇ serving to hold the wheel in a fixed position on the axle. To cause the follower wheel 29ª to track behind the plow or bull wheel, its supporting bracket 290 is adjustably mounted on the hanger 291, and for this purpose is provided with two sets of openings 292 through which bolts 293 pass for securing the same to said hanger in one position or the other, as shown in Figs. 1 and 9.

The steering of the machine is preferably effected by means comprising a sprocket chain 32 which engages a sprocket wheel 33 and whose free ends are attached to opposite sides of the steering segment 28. This sprocket wheel is mounted on a stub shaft 34 carried by a suitable casing 35 adjustably mounted on the frame 29 and is operatively connected with the steering shaft 36 by the worm 37 and worm wheel 38. The front end of the steering shaft is journaled in the casing 35 while its rear end is supported in a bearing plate 39 suitably secured to the rear end of the frame 29. The rear end of the steering shaft may be provided with a steering wheel 40 which is conveniently controlled from the operator's seat 41 provided on the supplemental frame.

42 represents a plow or similar agricultural implement which is attached to the supplemental frame 29 so as to be moved or dragged therewith. Any suitable means may be employed for coupling the implement to the frame, but as shown in the drawings said means are preferably constructed as follows:

Secured to the frame 29 is a saddle 44 having mounted thereon a transverse rock shaft 45 whose opposite ends are provided with rock arms 46. Depending from each of the latter is a link 47 which is secured to a fastening clip 48 carried by the beam 42ª of the plow. A control handle 49 is secured to one of the rock arms and extends rearwardly therefrom, said handle being adapted, in the normal inoperative position of the plow, to engage a hook 50 arranged on the underside of the bearing plate 39 as shown in Fig. 8 and thereby hold the plow in an elevated position. In this position, the front end of the beam of the plow bears against the underside of the main frame. In lowering the plow to its operative position, the handle 49 is released from its hook, whereupon said plow drops by gravity to the ground. To prevent the plow from swaying laterally, its rear end is provided with a pair of upright guide bars 51 which engage opposite sides of the tubular frame 29.

The means for operating the forward and reverse clutch from the seat of the operator are preferably constructed as follows:

The forward clutch control mechanism is arranged on the right hand side of the machine while the reverse clutch control mechanism is arranged on the left hand side thereof and inasmuch as the details of construction of these clutch controls are identical, a description of one will suffice for both.

52 indicates a vertically movable lifter rod or actuating member passing through an opening 53 in the steering segment 28 and eccentric to the axis of the coupling pin 31. which pivotally connects the tractor frame with the supplemental frame. This rod extends above and below the stearing segment and secured to its lower end is a cam lever 54 having an L-shaped upper portion 55 extending from its hub and a lower segmental portion 56 arranged in a plane at right angles to said upper portion. The segmental portion 56 is provided with an inclined face 57 which engages a roller 58 carried by the adjacent portion of the steering yoke 26. A link 59 connects this left hand cam lever with one arm of a horizontally movable bell crank lever 60 fulcrumed on the tractor frame 10, while the other arm thereof is connected by a link 61 to the reverse clutch control lever 62 operatively connected with the shiftable clutch member 21. A coil spring 63 guided on a stem 64 normally tends to shift the control lever outwardly to disengage these clutch members. The right hand cam lever is connected by a link 65 with a bell crank lever 66, which controls the forward clutch in a similar manner. Thus, should an upward vertical movement be imparted to each lifter rod, the inclined face of its cam lever will ride upwardly over the corresponding roller 58 and be oscillated or rocked horizontally to cause the actuation of the respective clutch. The links 59 and 65 preferably pass through the corresponding tubular sections 25, 25 of the main tractor frame, affording a very compact arrangement.

The vertical movement of each lifter rod 52 is effected by an eccentric or cam 67 mounted on a controller shaft or rod 68 journaled at its forward end in a bracket 69 loosely mounted on said lifter rod and supported on the upper side of the steering segment 28, while its rear end is loosely arranged in an opening 70 in the bearing plate 39 so as to permit of a slight universal movement of said shaft when the tractor and supplemental frames are moved to relative angular positions. Rotatably mounted on the upper end of the lifter rod is a disk or plate 71 which is engaged by the cam in effecting the vertical movement of said rod. The rear end of each shaft 68 may be provided with a suitable hand lever 72 for actuating the same. By this construction and arrangement of the clutch control mechanisms the same can be conveniently controlled from the operator's seat regardless of the relative angular positions of the tractor and supplemental frame, which in no way affects the control thereof.

The throttle valve of the carbureter 73 of the engine is also controlled from the operator's seat and preferably by a lever 74 fulcrumed on the upper end of one of the lifter rods 52, one arm of which is connected by a link 75 with the throttle control arm 76, while its other arm is connected by a rod 77 to a control lever 78 fulcrumed on the plate 39. The link 75 and rod 77 are pivotally connected to respective arms of the lever 74, the pivotal connection of said rod with its arm being preferably in approximate vertical alinement with the axis of the coupling pin 31 thereby eliminating any possibility of the throttle valve being actuated due to the variations in angular position of the tractor frame relatively to that of the supplemental frame. A suitable toothed segment 79 may be provided with which the underside of the control lever 78 is adapted to engage for holding the latter in various adjusted positions.

I claim as my invention:

1. In a tractor, the combination of a main frame having traction wheels, a motor thereon, means for transmitting power from the motor to the traction wheels including a clutch, a supplemental frame pivotally connected to said main frame, and means for operating said clutch including an actuating member carried by the main frame and having its axis arranged eccentric to the pivot of said main frame and supplemental frame, said actuating member being capable of a rotary and sliding movement and controlled from said last-named frame, the axis of the pivotal connection between the main and supplemental frames and the axis of the actuating member being parallel and vertical.

2. In a tractor, the combination of a main frame having traction wheels, a motor thereon, means for transmitting power from the motor to the traction wheels including a clutch, a supplemental frame pivotally connected to said main frame, and means for operating said clutch including an actuating member carried by the main frame and capable of a compound vertical and oscillatory movement, and means for operating said actuating member.

3. In a tractor, the combination of a main frame having traction wheels, a motor thereon, means for transmitting power from the motor to the traction wheels including a clutch, a supplementary frame pivotally connected to said main frame, and means for operating said clutch including an oscillatory actuating member carried by the main frame and having its axis arranged eccentric to the pivot of the latter and said supplemental frame, and means for effecting a vertical movement of said actuating member to oscillate the same, the axis of the pivotal connection between the main and supplemental frames and the axis of the actuating member being parallel and vertical.

4. In a tractor, the combination of a main frame having traction wheels, a motor thereon, means for transmitting power from the motor to the traction wheels including a clutch, a supplementary frame pivotally connected to said main frame, and means for operating said clutch including an actuating member carried by the main frame and having its axis arranged eccentric to the pivot of the latter and said supplemental frame, and means for effecting an oscillatory movement of said actuating member, the axis of the pivotal connection between the main and supplemental frames and the axis of the actuating member being parallel and vertical.

5. In a tractor, the combination of a main frame having traction wheels, a motor thereon, means for transmitting power from the motor to the traction wheels including a clutch, a supplementary frame pivotally connected to said main frame, and means for operating said clutch including an actuating member carried by the main frame and having its axis arranged eccentric to the pivot of the latter and said supplemental frame, and means for effecting a combined vertical and oscillatory movement of said actuating member, the axis of the pivotal connection between the main and supplemental frames and the axis of the actuating member being parallel and vertical.

6. In a tractor, the combination of a main frame having traction wheels, a motor thereon, means for transmitting power from the motor to the traction wheels including a clutch, a supplemental frame pivotally connected to said main frame, and means for operating said clutch including a rotatable actuating member, means for imparting a vertical movement to said actuating member, and means for causing the rotation of the latter upon the vertical movement thereof.

7. In a tractor, the combination of a main frame having traction wheels, a motor thereon, means for transmitting power from the motor to the traction wheels including a clutch, a supplementary frame pivotally connected to said main frame, and means for operating said clutch including a rotatable actuating member, a cam lever mounted on said member and engaging a portion of said main frame, said lever being operatively connected to said clutch, and means for imparting a vertical movement to said actuating member, whereby said cam member and said actuating member are rotated.

8. In a tractor, the combination of a main frame having traction wheels, a motor thereon, means for transmitting power from the motor to the traction wheels including a clutch, a supplementary frame pivotally connected to said main frame, and means for operating said clutch including an actuating member, a cam lever mounted on said member and operatively connected with said clutch, means for effecting a vertical movement of said actuating member, and means co-operating with said cam lever for oscillating it upon the vertical movement of said actuating member, whereby said cam lever is oscillated.

9. In a tractor, the combination of a main frame having traction wheels, a motor thereon, means for transmitting power from the motor to the traction wheels including a clutch, a supplemental frame pivotally connected to said main frame, and means for operating said clutch including an actuating member, a cam lever mounted on said member and operatively connected to said clutch, a controller shaft journaled at its opposite ends to said main frame and supplemental frame, respectively, and means on said shaft for effecting a vertical movement of said actuating member whereby said cam lever is oscillated to operate said clutch.

10. In a tractor, the combination of a main frame having traction wheels, a motor thereon, means for transmitting power from the motor to the traction wheels including a clutch, a supplemental frame pivotally connected to said main frame, and means for operating said clutch including a vertically movable lifter rod, a cam lever mounted at the lower end of the latter operatively connected to said clutch and having an inclined face, a fixed contact arranged on said main frame and engaging the inclined face of said cam lever, a disk arranged on the upper end of said lifter rod, a controller shaft journaled at its opposite ends to said main frame and supplemental frame, respectively, and an eccentric carried by said shaft and co-operating with said disk to elevate said lifter rod, whereby said cam lever is oscillated to operate said clutch.

11. In a tractor, the combination of a main frame having traction wheels, a motor thereon, means for transmitting power from the motor to the traction wheels including a clutch, a supplemental frame pivotally connected to said main frame, a steering segment mounted on the latter, steering means carried by the supplemental frame operatively connected to said segment, and means for operating said clutch including a lifter rod carried by said steering segment and eccentric to the pivot of said main frame and supplemental frame, a cam lever operatively connected to said clutch mounted on said lifter rod and having an inclined face, a roller on said tractor frame with which the inclined face of said cam lever engages, and means for actuating said lifter rod, whereby said cam is oscillated to operate said clutch.

12. In a tractor, the combination of a main frame having traction wheels, a motor thereon, means for transmitting power from the motor to the traction wheels including a clutch, a supplemental frame pivotally connected to said main frame, means for operating said clutch including an actuating member carried by the main frame and eccentric to the pivot of said main frame and supplemental frame, means for imparting a combined vertical and oscillatory movement to said member, a bell crank lever fulcrumed on said main frame, one arm of which is operatively connected to said clutch, and a link connecting said actuating member with the other arm of said bell crank lever.

13. In a tractor, the combination of a main frame having traction wheels, a motor thereon, means for transmitting power from the motor to the traction wheels including a clutch, a supplementary frame pivotally connected to said main frame, and means for operating said clutch including an actuating member, a cam lever mounted on said member, means for imparting a vertical movement to said actuating member whereby said cam lever is oscillated, a bell crank lever fulcrumed on said main frame, one arm of which is operatively connected to said clutch, and a link connecting said cam lever with the other arm of said bell crank lever.

14. A tractor having a main frame comprising an axle bearing, an axle journaled in the latter, traction wheels mounted on said axle, tubular members extending from said axle bearing, a steering yoke carried by said members, and a supplemental frame pivotally connected to the steering yoke of said main frame.

15. A tractor having a main frame comprising an axle bearing, an axle journaled in the latter, traction wheels mounted on said axle, tubular members extending from said axle bearing and adjustable lengthwise thereof, a steering yoke carried by said members, a supplemental frame arranged in rear of said main frame, a supporting member carried by the rear end of said supplemental frame, and a steering knuckle provided at the front end thereof and pivotally connected to the steering yoke of said main frame.

FRED C. OLIN.